US011118998B2

(12) United States Patent
Takamori et al.

(10) Patent No.: US 11,118,998 B2
(45) Date of Patent: Sep. 14, 2021

(54) SOUNDNESS DETERMINATION DEVICE, SOUNDNESS DETERMINATION METHOD, AND SOUNDNESS DETERMINATION PROGRAM

(71) Applicant: FUJIFILM Corporation, Tokyo (JP)

(72) Inventors: Tetsuya Takamori, Tokyo (JP); Satoshi Kubota, Tokyo (JP); Masayuki Negoro, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 293 days.

(21) Appl. No.: 15/902,936

(22) Filed: Feb. 22, 2018

(65) Prior Publication Data

US 2018/0217024 A1   Aug. 2, 2018

Related U.S. Application Data

(63) Continuation of application No. PCT/JP2016/073998, filed on Aug. 17, 2016.

(30) Foreign Application Priority Data

Sep. 16, 2015   (JP) .............................. JP2015-182792

(51) Int. Cl.
  *G01M 5/00* (2006.01)
  *G01C 11/02* (2006.01)

(52) U.S. Cl.
  CPC ........... *G01M 5/0033* (2013.01); *G01C 11/02* (2013.01); *G01M 5/0091* (2013.01)

(58) Field of Classification Search
  CPC .... G01M 5/0033; G01M 5/0091; G01C 11/02
  See application file for complete search history.

(56) References Cited

U.S. PATENT DOCUMENTS 10,429,269 B2 * 10/2019 Yoshida .............. G01M 5/0033
2012/0173150 A1 * 7/2012 Romero ................ G01S 13/885
                                                        702/14

(Continued)

FOREIGN PATENT DOCUMENTS

JP     2001-349887 A    12/2001
JP     2003-329550 A    11/2003

(Continued)

OTHER PUBLICATIONS

Extended European Search Report issued by the European Patent Office dated Jul. 10, 2018, which corresponds to EP16846186.1-1001 and is related to U.S. Appl. No. 15/902,936.

(Continued)

*Primary Examiner* — Mohammad K Islam
(74) *Attorney, Agent, or Firm* — Studebaker & Brackett PC

(57) ABSTRACT

An inspection specifying unit specifies a member position that is a point and a type of damage that is a soundness determination target on the basis of building structure information. An inspection data analysis unit acquires the image data from an inspection data acquisition unit, analyzes the image data, and determines from the image data, whether or not there is damage of the type of damage specified as the inspection target, and the degree of damage in a case where there is the damage. A damage influence degree calculation unit calculates the degree of damage influence for each damage. A soundness determination unit determines the soundness of the entire building on the basis of the degree of damage influence for each damage. A soundness output unit outputs the soundness determined in to a display, a printer, or the like.

14 Claims, 6 Drawing Sheets

(56) References Cited

U.S. PATENT DOCUMENTS

| | | | | |
|---|---|---|---|---|
| 2013/0272569 A1* | 10/2013 | Yumbe | ............... | G06K 9/3241 382/103 |
| 2014/0100889 A1* | 4/2014 | Tofte | ............... | G06K 9/00791 705/4 |
| 2014/0168420 A1 | 6/2014 | Naderhirn et al. | | |
| 2016/0027051 A1* | 1/2016 | Gross | ............... | G06K 9/46 705/14.54 |
| 2017/0038307 A1* | 2/2017 | Ohta | ............... | G01B 11/16 |
| 2017/0308088 A1 | 10/2017 | Sabe et al. | | |
| 2018/0106609 A1* | 4/2018 | Imai | ............... | G01M 5/0041 |

FOREIGN PATENT DOCUMENTS

| | | |
|---|---|---|
| JP | 2006-090118 A | 4/2006 |
| JP | 2006-338312 A | 12/2006 |
| JP | 2006-338654 A | 12/2006 |
| JP | 4279159 B2 | 6/2009 |
| JP | 2016-021725 A | 2/2016 |
| JP | 2016-057792 A | 4/2016 |
| JP | 2016-082441 A | 5/2016 |
| JP | 2016-133320 A | 7/2016 |
| WO | 2013/168991 A1 | 11/2013 |
| WO | 2015/111735 A1 | 7/2015 |

OTHER PUBLICATIONS

International Search Report issued in PCT/JP2016/073998; dated Oct. 25, 2016.

Written Opinion issued in PCT/JP2016/073998; dated Oct. 25, 2016.

International Preliminary Report on Patentability issued in PCT/JP2016/073998; dated Mar. 20, 2018.

* cited by examiner

| NAME | STRUCTURE | IMAGE DATA | POSITION INFORMATION | IMAGING DATE AND TIME | MEMBER | | |
|---|---|---|---|---|---|---|---|
| | | | | | UPPER STRUCTURE | LOWER STRUCTURE | SUPPORT | OTHERS |
| O×BRIDGE | 2 SPAN CONTINUOUS STEEL FLOOR BOX GIRDER BRIDGE | XXXX.jpg | X= Y= Z= | ××△.○○○○ □□:** | MAIN GIRDER: STEEL TRANSVERSE GIRDER: STEEL SLAB: PC | ABUTMENT: RC PIER:RC | RUBBER | BRIDGE FALL PREVENTION APPARATUS: CABLE |

P-14

POSITION INFORMATION
 X= ......
 Y= ......
 Z= ......

IMAGING DATE AND TIME
 ××△,○○○○
 □□:**

P-15

CRACK AREA S
$=(X_1-X_0) \times (Y_1-Y_0)$

IMAGING DATE AND TIME
 ××△,○○○○
 □□:**

P-18

SCOURING LENGTH $L=Z_0$

IMAGING DATE AND TIME
 ××△,○○○○
 □□:**

$t = t_0$
$nt_0 = 0$ $t = t_1$
$nt_1 = 0$ $t = t_2$
$nt_2 = 12$
$rt_2 = \dfrac{12}{t_2 - t_1}$ $t = t_3$
$nt_3 = 30$
$rt_3 = \dfrac{18}{t_3 - t_2}$ $t = t_4$
$nt_4 = 30$
$rt_4 = 0$ $t = t_5$
$nt_5 = 30$
$rt_5 = 0$

SOUNDNESS DETERMINATION DEVICE, SOUNDNESS DETERMINATION METHOD, AND SOUNDNESS DETERMINATION PROGRAM

CROSS-REFERENCE TO RELATED APPLICATIONS

This application is a Continuation of PCT International Application No. PCT/JP2016/073998 filed on Aug. 17, 2016, which claims priority under 35 U.S.C § 119(a) to Japanese Patent Application No. 2015-182792 filed on Sep. 16, 2015. Each of the above application(s) is hereby expressly incorporated by reference, in its entirety, into the present application.

BACKGROUND OF THE INVENTION

1. Field of the Invention

The present invention relates to a soundness determination device, a soundness determination method, and a non-transitory computer readable recording medium storing a soundness determination program, and more particular, to a soundness determination device, a soundness determination method, and a non-transitory computer readable recording medium storing a soundness determination program for diagnosing soundness of a building.

2. Description of the Related Art

Determining soundness of buildings such as bridges, tunnels, or buildings from results of inspection of the buildings is performed in the related art. The inspection is performed as observation of a deformation phenomenon such as cracks, and causes of the deformation are specified on the basis of information on the inspection, a surrounding environment, design information of the building, or the like, and the determination of the soundness is performed.

In order to accurately perform the determination of the soundness, advanced and extensive expertise and long analysis time are required. Therefore, a system for supporting the determination of the soundness has been considered.

JP2003-329550A describes analyzing a test body included in each component and diagnosing a deterioration situation of each component. As a result of detaching and analyzing a block-shaped test body for a foundation of a building, repair is not performed unless neutralization progresses, and it is necessary to form, for example, a waterproof coating film on a surface when the neutralization progresses up to a certain portion of a thickness of a concrete, or repair can be performed according to a deterioration state. For example, a neutralized portion is removed and a concrete is poured again. In a case where cracks are slightly generated on a coating film surface of an outer wall material, it is sufficient to perform repair by painting the surface, and initial performance can be sufficiently achieved through such repair, which can be determined not to affect lifetime. As described above, since the test body provided in each component is analyzed and a deterioration situation of each component is accurately diagnosed and repaired, it is possible to perform optimal repair on each component.

JP2006-338312A discloses displaying an option of a type of damage that can be input, to an investigator using an option table indicating a correspondence relationship between a member of a bridge and a type of damage (inspection target damage) that may occur in the member. Accordingly, damage classification related to a combination of a type of work, a member, and a material, an evaluation item of a degree of damage corresponding to the damage classification, and an evaluation criterion are presented to an investigator as options, and a guideline causing an investigator to evaluate each damage is given. Further, JP2006-338312A describes that a manager causes the investigator to capture a photograph after sending an advice to the investigator.

JP4279159B describes a system for estimating causes of a deformation on the basis of deformation information, structure information, and information on surroundings of a building and determining soundness. That is, a crack caused by external force among cracks in tunnel lining is automatically picked up from a deformation development view, and collated with 50 or more types of crack deformation patterns in advance to check which of the crack deformation patterns the crack corresponds to, and an external force acting on the tunnel is estimated on the basis of the corresponding crack deformation pattern and basic information such as a ground condition of surroundings, a geological condition, a construction condition at the time of construction, and a structure condition. Further, dynamical soundness of the tunnel is determined on the basis of information on the basic information together with the estimated causes of the deformation.

SUMMARY OF THE INVENTION

In recent years, aging of social infrastructures has become a problem. At the time of maintenance of an aged social infrastructure, it is preferable for an inspector with expertise to inspect each place of the infrastructure in detail. However, there are restrictions caused by a budget, personnel, and a place or the number of installed infrastructures, and it is difficult to instantaneously inspect all infrastructures. Therefore, a mechanism for easily and rapidly performing inspection with a focused main point for distinguish between serious damage requiring urgent measures and non-serious damage is required.

In JP2003-329550A, a deterioration situation is diagnosed only from a type of component of a structure, and how much damage influences soundness of an entire building in relation to a position of a member on a structure is not analyzed. Therefore, there is a possibility of being determined that a requirement of repair work is low despite the fact that a place having a great influence on safety of a building on a structure is damaged. Further, in JP2003-329550A, since it is necessary to fix test bodies corresponding the number of times of test in each component in advance, take out the test body in each test, and perform analysis, a technology disclosed in JP2003-329550A cannot be applied to a structure without the test body.

In JP2006-338312A, since evaluation itself is performed by an investigator, the investigator must have expertise. Further, since the investigator has to confirm evaluation items and evaluation criteria one by one for the combination of the type of work, the member, and the material, it takes time to inspect at the site.

In JP4279159B, a determination of the soundness is performed from information on a deformation or damage of the entire building regardless of a difference in an influence of the deformation or the damage of the building on a strength or the soundness of the building according to a part of occurrence or a type of damage. Therefore, in order to determine the soundness of the building, it is necessary to perform inspection of the entire building, which requires a large effort. Further, in JP4279159B, since the influence according to the part or the type of damage is not evaluated, an accurate determination cannot be performed in some cases. Further, JP4279159B does not specifically describe how to estimate causes of the deformation from basic information of the tunnel. Therefore, a determination of mechanical soundness depends on the estimation of the causes of the deformation considering the basic information of the tunnel by a technician with expertise. Therefore, each technician must estimate the causes of the deformation for each tunnel that is an inspection target, and it is difficult to secure the technician.

The present invention has been made in view of the above circumstances, and an object of the present invention is to provide a soundness determination device, a soundness determination method, and a non-transitory computer readable recording medium storing a soundness determination program that enable an accurate and efficient soundness determination to be performed in consideration of a degree of influence of damage according to structure information of a building.

In order to solve the above problem, a first aspect of the present invention provides a soundness determination device comprising: a damaged portion extraction unit that extracts a damaged portion of one or a plurality of buildings from a captured image in which a surface of an arbitrary building is a subject; an important portion position determination unit that determines a position of an important portion on a structure of the building in the captured image; a damage influence degree calculation unit that calculates, for each damaged portion of the building, a degree of damage influence indicating a degree of influence of the damaged portion of the building on the basis of a relative positional relationship between the position of the important portion of the building determined by the important portion position determination unit and the damaged portion of the building extracted by the damaged portion extraction unit; and a soundness determination unit that determines soundness of the building on the basis of the degree of damage influence for each damaged portion of the building calculated by the damage influence degree calculation unit.

According to the present invention, the degree of damage influence indicating the degree of influence of the damaged portion of the building is calculated for each damaged portion of the building on the basis of the relative positional relationship between the position of the important portion of the building and the damaged portion of the building, and the soundness of the building is determined on the basis of the calculated degree of damage influence of each damaged portion of the building. It is possible to determine the soundness of the entire building using the degree of influence of damage according to the position of each damage extracted from the building, and to perform an accurate and efficient soundness determination in consideration of the structure information of the building.

In the soundness determination device according to a second aspect of the present invention, the damage influence degree calculation unit calculates the degree of damage influence according to a reciprocal of a distance between the position of the important portion of the building and the damaged portion of the building.

The soundness determination device according to the third aspect of the present invention further comprises: a damage extraction unit that extracts a type of damage and a degree of damage in the damaged portion of the building extracted by the damaged portion extraction unit, wherein the damage influence degree calculation unit calculates a degree of damage influence indicating a degree of influence of the damaged portion of the building on the basis of a relative positional relationship between the position of the important portion of the building determined by the important portion position determination unit and the damaged portion of the building extracted by the damaged portion extraction unit, and the type of damage and the degree of damage in the damaged portion of the building extracted by the damage extraction unit.

In the soundness determination device according to a fourth aspect of the present invention, the important portion of the building includes at least one of a joint portion of a member, a support, or a reinforcing place of a concrete of the building.

In the soundness determination device according to a fifth aspect of the present invention, a position of the important portion of the building determined by the important portion position determination unit is a central portion between spars of a concrete bridge girder or a central portion between spars of a steel bridge girder, the type of damage in the damaged portion of the building includes at least one of crack of the concrete bridge girder, or corrosion, crack, or rupture of the steel concrete bridge girder, a degree of damage in the damaged portion of the building includes at least one of degrees of progress of the crack of the concrete bridge girder, or the corrosion, the crack, or the rupture of the steel concrete bridge girder, and the damage influence degree calculation unit calculates the degree of damage influence according to a value obtained by multiplying a reciprocal of a distance between the position of the important portion of the building and the damaged portion of the building by at least one of the degrees of progress of the crack of the concrete bridge girder, or the corrosion, the crack, or the rupture of the steel concrete bridge girder.

In the soundness determination device according to a sixth aspect of the present invention, the degree of progress of the crack of the concrete bridge girder, or the corrosion, the crack, and the rupture of the steel concrete bridge girder includes at least one of a length and a width of the crack of the concrete bridge girder, an area of the corrosion of the steel concrete bridge girder, or a length and a width of the crack or the rupture of the steel concrete bridge girder.

In the soundness determination device according to a seventh aspect of the present invention, the degree of progress of the crack of the concrete bridge girder, and the corrosion, the crack, and the rupture of the steel concrete bridge girder includes at least one of a rate of change of a length and a width of the crack of the concrete bridge girder, a rate of change of an area of the corrosion of the steel concrete bridge girder, or a rate of change of a length and a width of the crack or the rupture of the steel concrete bridge girder.

The soundness determination device according to an eighth aspect of the present invention further comprises a structure information acquisition unit that acquires structure information of the building, wherein the important portion position determination unit determines the position of the important portion of the building on the basis of the structure information of the building acquired by the structure information acquisition unit.

In the soundness determination device according to a ninth aspect of the present invention, the structure information acquisition unit acquires structure information of the building from a captured image in which the building is a subject.

The soundness determination device according to a tenth aspect of the present invention further comprises: soundness output unit that outputs soundness of the building determined by the soundness determination unit.

In the soundness determination device according to an eleventh aspect of the present invention, the soundness output unit outputs all or a part of a captured image of the damaged portion of the building extracted by the damaged portion extraction unit according to the degree of damage influence of each damaged portion of the building calculated by the damage influence degree calculation unit.

An eleventh aspect of the present invention provides a soundness determination method comprising: a damaged portion extraction step of extracting a damaged portion of one or a plurality of buildings from a captured image in which a surface of an arbitrary building is a subject; an important portion position determination step of determining a position of an important portion on a structure of the building in the captured image; a damage influence degree calculation step of calculating, for each damaged portion of the building, a degree of damage influence indicating a degree of influence of the damaged portion of the building on the basis of a relative positional relationship between the position of the important portion of the building determined in the important portion position determination step and the damaged portion of the building extracted in the damaged portion extraction step; and a soundness determination step of determining soundness of the building on the basis of the degree of damage influence for each damaged portion of the building calculated in the damage influence degree calculation step.

A non-transitory computer readable recording medium storing a soundness determination program for causing a computer to execute the soundness determination method is also included in the present invention.

According to the present invention, the degree of damage influence indicating the degree of influence of the damaged portion of the building is calculated for each damaged portion of the building on the basis of the relative positional relationship between the position of the important portion of the building and the damaged portion of the building, and the soundness of the building is determined on the basis of the calculated degree of damage influence of each damaged portion of the building. It is possible to determine the soundness of the entire building using the degree of influence of damage according to the position of each damage extracted from the building, and to perform an accurate and efficient soundness determination in consideration of the structure information of the building.

DESCRIPTION OF THE PREFERRED EMBODIMENTS

Figure 1:
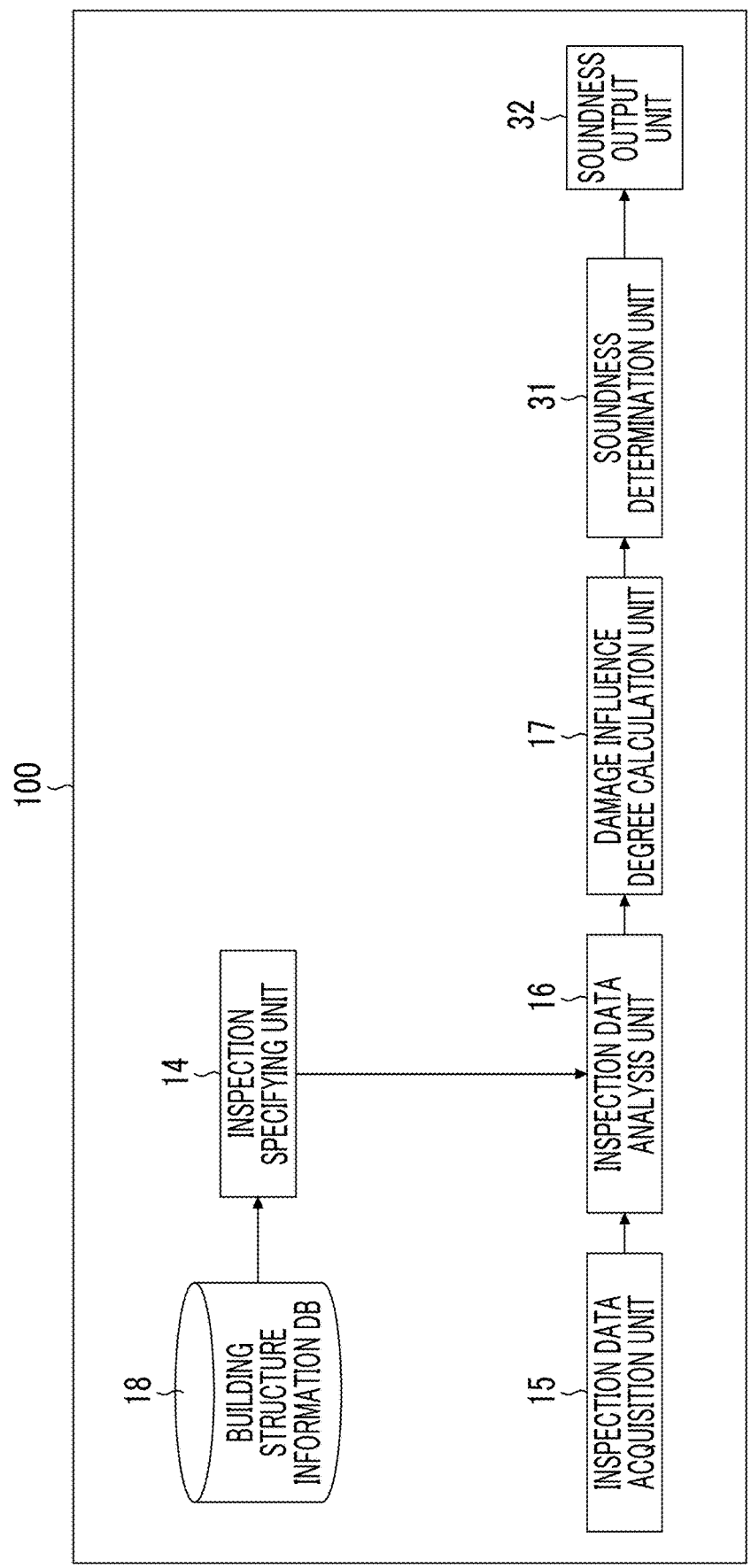
FIG. 1 is a block diagram illustrating a schematic configuration of a soundness determination device.

FIG. 1 is a block diagram illustrating a schematic configuration of a soundness determination device 100 to which the present invention has been applied. The soundness determination device 100 includes an inspection specifying unit 14, an inspection data acquisition unit 15, an inspection data analysis unit 16, a damage influence degree calculation unit 17, a building structure information database (DB) 18, a soundness determination unit 31, and a soundness output unit 32.

Each unit included in the soundness determination device 100 can be configured as a known information processing device, such as a personal computer, a smartphone, a mobile phone, or a tablet terminal, including a processor, a random access memory (RAM), a read only memory (ROM), a flash memory, a display, a speaker, a touch panel, a communication interface, and the like.

Figure 2:
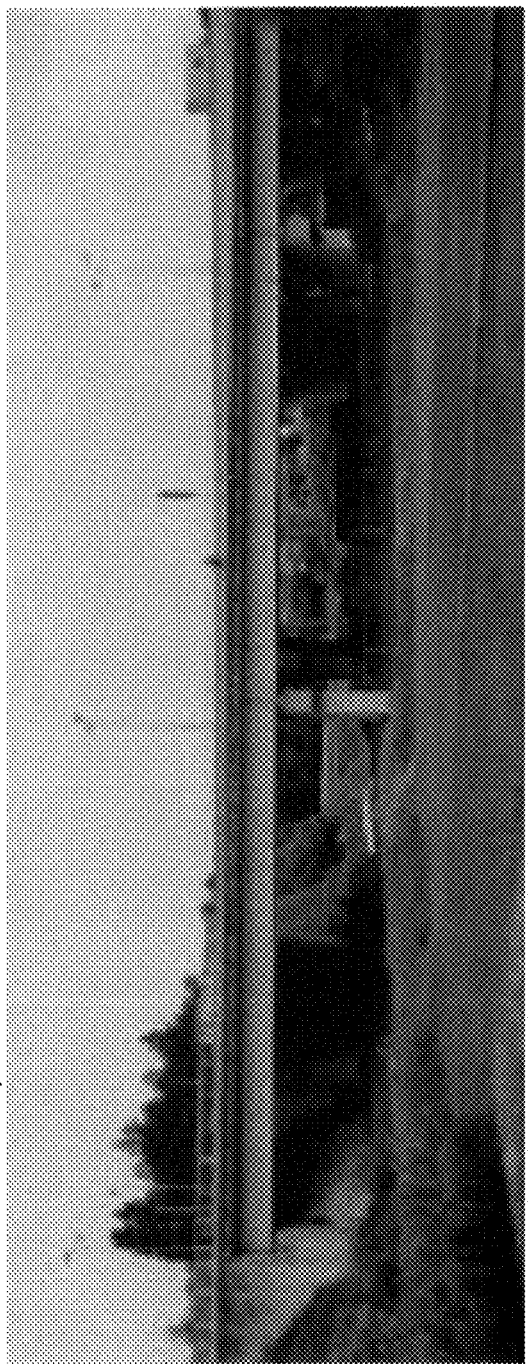
FIG. 2 is a diagram illustrating an example of building structure information that is accumulated in a building structure information DB.

As illustrated in FIG. 2, a design book or a completion drawing of an arbitrary building that is an inspection target, a name, a structure format of the building, image data in which an appearance of a structure of the arbitrary building that is an inspection target is recorded, a structure and a material of each part of the building, a structural positional relationship between respective parts of the building, and the like are accumulated in the building structure information DB 18. Although not illustrated, the building structure information DB 18 may accumulate building structure information of a plurality of different buildings or may accumulate building structure information of one building that is an inspection target. The structure information acquisition unit corresponds to the building structure information DB 18.

For example, in a case where the building is a bridge, a format of a basic structure of the building is a girder bridge, a truss bridge, an arch bridge, a suspension bridge, a rahmen bridge, or the like.

For materials of respective parts of the girder bridge, a main girder and a cross girder of an upper structure of the girder bridge are made of steel, a slab is made of prestressed concrete (PC), a support is made of rubber, and a lower structure is a reinforced concrete (RC) pile foundation or direct foundation.

In a case where a design book or a completion drawing of a building that is an inspection target cannot be acquired, the inspection specifying unit 14 can compare an entire external appearance photograph (see FIG. 2) of the building that is an inspection target with a structure model (see FIG. 3) of a typical structure registered in the building structure information DB 18, and determine the building structure information that is an inspection target. This can be done by human work, or can be automated or semi-automated by input work to a computer or a process using the computer. In a case where a design book or a completion drawing of a building that is an inspection target can be acquired, these can be accumulated in the building structure information DB 18 as building structure information as they are. However, since the design book or the completion drawing may be different from actual construction results or a current state may be different from the design book or the completion drawing due to repair or replacement of members, these may be included in the building structure information, if possible.

The inspection specifying unit 14 specifies a point member position which is a position of an important portion of the building which is a point of a determination of the soundness of the building from constituent members of the building, and a type of damage that is a soundness determination target near the point member position on the basis of the building structure information of the building structure information DB 18. This is a function of specifying the position of the important member in terms of a structure and the type of damage which becomes a problem in the vicinity thereof in advance in determining soundness. As an example, the specifying of the point member position and the type of damage is performed as follows. The important portion position determination unit corresponds to the above function of the inspection specifying unit 14.

It is assumed that a format of a basic structure of the building that is the inspection target being a girder bridge, a main girder and a cross girder of an upper structure of the girder bridge being made of steel, a slab being made of concrete, and a support being made of rubber are defined in the building structure information accumulated in the building structure information DB 18.

In this case, the inspection specifying unit 14 specifies a steel member in a central portion between spars of a main girder of an upper structure of the girder bridge as the point member position that is an inspection target, and also specifies corrosion, rupture, crack, deflection, and dropout of bolt or nut of the steel member in the central portion between the spars of the main girder as a type of damage of the inspection target. This is because a central portion between spars of the main girder that is particularly over-weighted in structural mechanics (a position at which a bending moment is largest), and the vicinity thereof are intensively inspected, instead of all steel members being inspected. Reference signs 12, 14, and 16 in FIG. 3 indicate positions of the steel member in the central portion between the spars of the main girder specified in the point member position.

Further, the inspection specifying unit 14 specifies the lower surface of the slab as the point member position, and specifies cracks of the lower surface of the slab and concrete peeling and floating as the type of damage of the inspection target. Reference signs 112, 113, and 114 in FIG. 3 indicate the positions of the lower surface of the slab specified as the point member positions.

Further, in the case of a concrete bridge, an end fulcrum portion that is easily damaged due to support reaction force, earthquake, a horizontal force due to temperature change, or the like, an intermediate fulcrum that is cracked due to a maximized negative bending moment and a maximized shear force, the vicinity of ¼ of a spar that is easily cracked due to a small amount of rebars at a bending point of the rebars, a fixation unit that is easily cracked due to concentration of tensile stress, a gel bar hinge portion or a girder cutout portion that is easily cracked due to local stress concentration, a joint portion of a member such as a joint portion, a support, a bolt, a nut, or a rivet, a rebar arrangement place, or the like can be specified as a point member position, and the crack can be specified as a type of damage of the inspection target. In the case of a steel bridge, the vicinity of ¼ of a spar in which a shear crack occurs, a joint portion of a member such as a hinge portion, a support, a bolt, a nut, and a rivet that is cracked due to local stress concentration, a rebar arrangement place of a concrete wall or slab, or the like can be specified as the point member position, and the crack can be specified as the type of damage of the inspection target.

Further, the inspection specifying unit 14 specifies a pier foundation portion as the point member position, and specifies scouring, subsidence, movement, and inclination of the pier foundation portion as the types of damage of the inspection object. Reference signs I8, I9, I10, and I11 in FIG. 3 indicate positions of the pier foundation portion specified as the point member positions.

The term "inspection" used herein does not necessarily include only skills or decision of personnel with expertise for buildings, but includes simple work such as capturing images at the site. Further, the image herein may be not only a visible light image but also an infrared image.

Figure 4A:
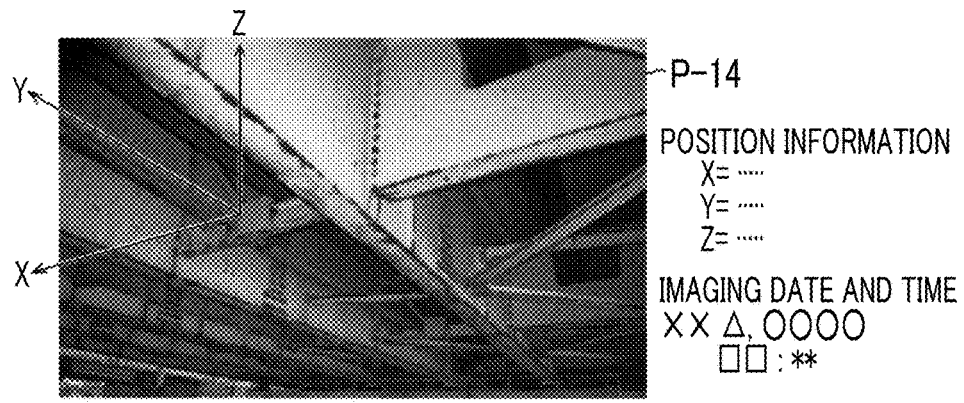
FIGS. 4A to 4C are diagrams illustrating an example of inspection data.
Figure 4B:
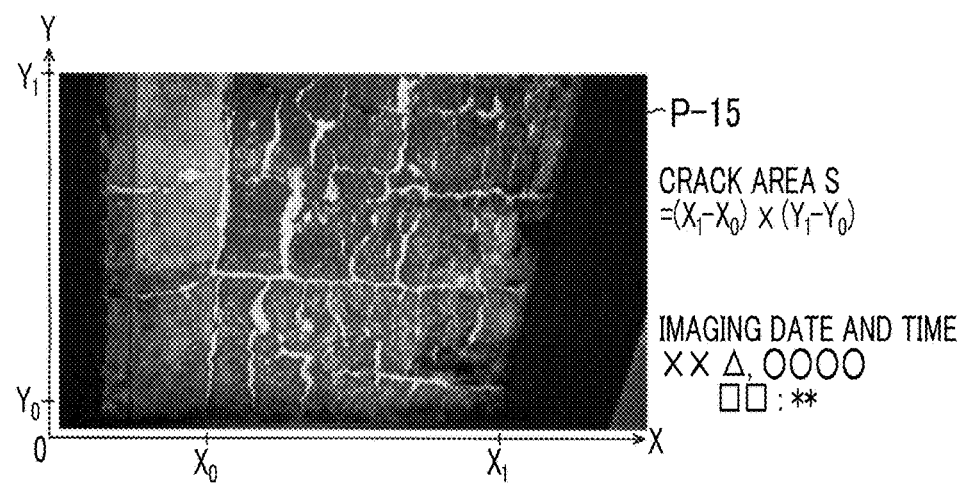
Figure 4C:
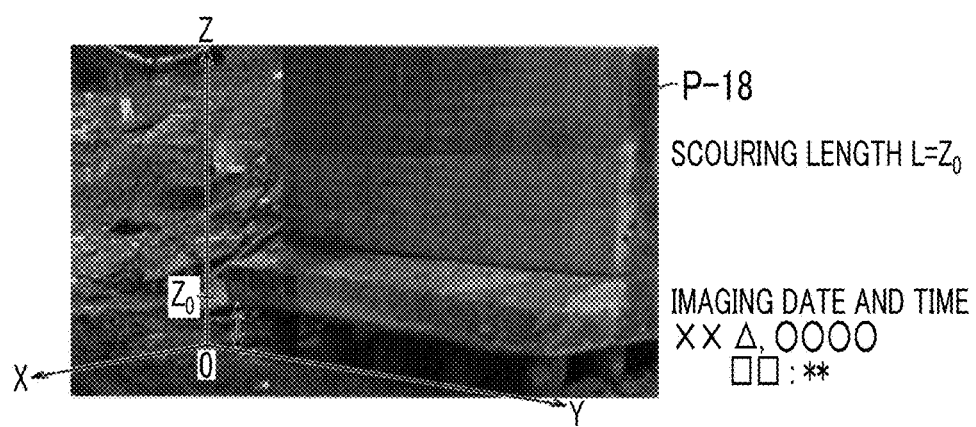
Figure 5A:
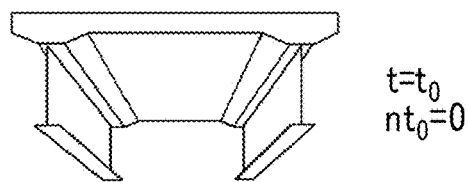
FIGS. 5A to 5F are diagrams illustrating an example of progress of cracks in a slab.
Figure 5B:
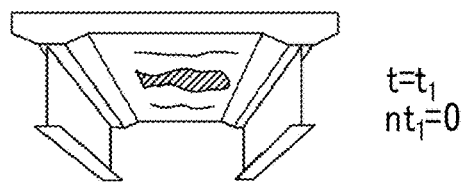
Figure 5C:
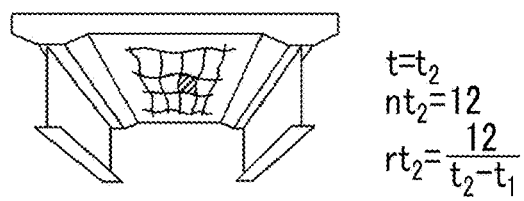
Figure 5D:
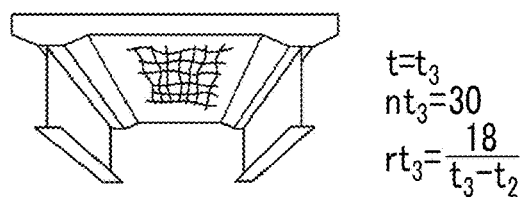
Figure 5E:
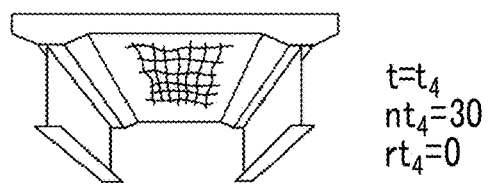
Figure 5F:
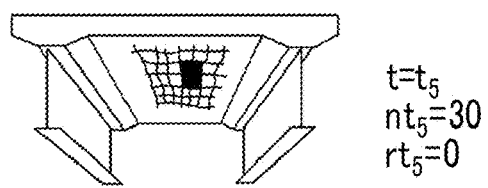

As illustrated in FIGS. 4A to 4C, the inspection data acquired by the inspection data acquisition unit 15 includes image data in which each member of an arbitrary building that is an inspection target is a subject, position information of each member of which the image is recorded, and capturing date and time of the image data. FIG. 4A illustrates a captured image of a longitudinal girder and a cross girder, FIG. 4B illustrates a captured image of the lower surface of the slab, and FIG. 4C illustrates a captured image of the pier foundation portion. The position information of the members may be based on position information obtained by a global positioning system (GPS). For example, image data associated with the position information of members is recorded by a person carrying a camera with a GPS or a drone or a robot having a camera with a GPS mounted thereon. Further, using an imaging date and time recording function of the camera, the capturing time point of the image data is recorded in association with the image data.

In a case where a subject image of each member of a building is recorded by a camera, all the members may be evenly included in the image data, and a photographer or an imaging device need not to selectively image important members and non-important members. That is, at the time of imaging, it is unnecessary to select an imaging place, but instead, it is necessary to recognize and image the subject without omitting each member of the building. Further, the imaging may not be one imaging, and imaging the same member position plural times at different times as in fixed point observation is included.

Since information on a position of each member present in the building rather than position information on the earth of the member is required in the soundness determination, it is necessary for the position information on the earth to be converted into relative position information on the building at a local coordinate set in the building that is an inspection target. For example, this conversion is performed by converting the position information on the earth into coordinates appropriately set on the building (for example, XYZ coordinates with a start point of the bridge as an origin). This can be realized by simple linear conversion. Hereinafter, it is assumed that the position information of the member included in the inspection data is the position information of the member in the building.

Figure 3:
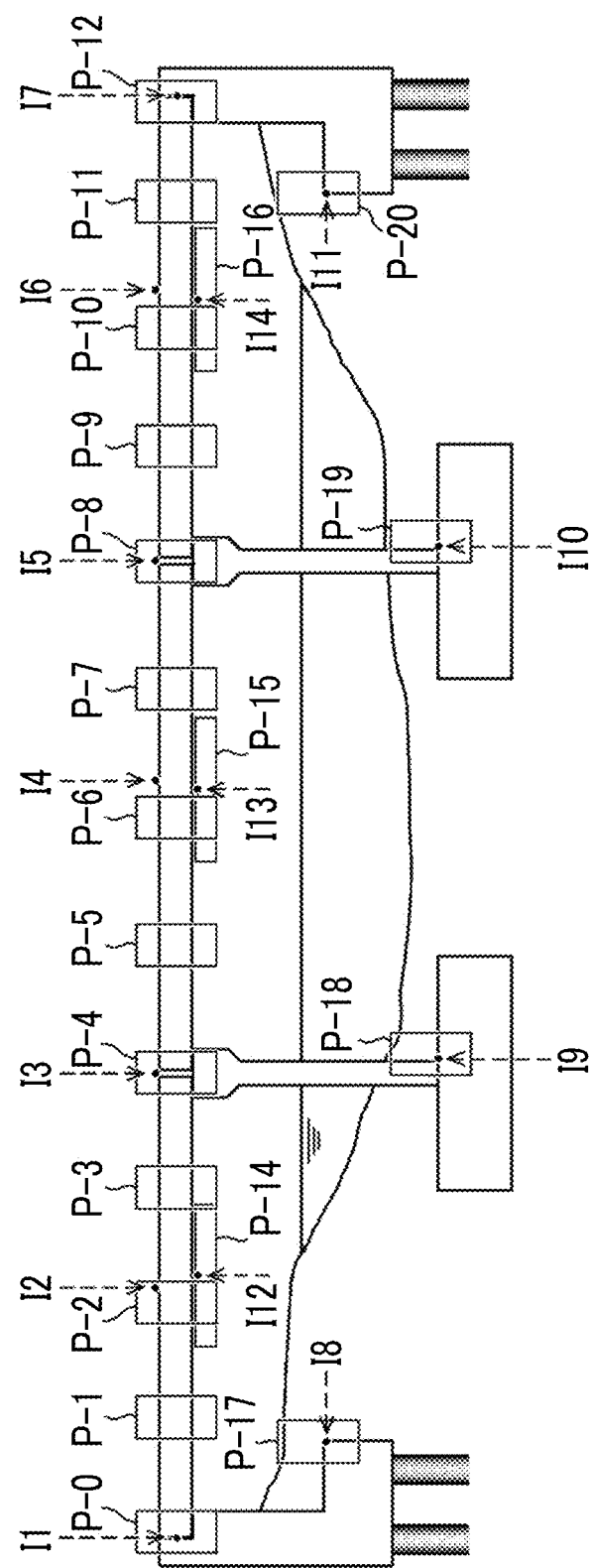
FIG. 3 is a diagram illustrating an example of a structure model of a building.

For example, a capturing position of a captured image in FIG. 4A is P-14 in FIG. 3, a capturing position of a captured image in FIG. 4B is P-15 in FIG. 3, and a capturing position of a captured image of FIG. 4C is P-18 in FIG. 3. The capturing position may be a one-dimensional point or may be a two- or three-dimensional range. However, in the case of the range, the one-dimensional point such as a center or a centroid of the range is used as the capturing position. This is because the distance between the point member position and the capturing position is obtained, as described below.

The inspection data acquisition unit 15 may acquire the inspection data from a movable device such as a drone or a robot on which the above-described camera with a GPS has been mounted, or may be a device in which the inspection data acquisition unit 15 itself generates the inspection data.

The inspection data analysis unit 16 acquires the image data of which the imaging position is the vicinity of the point member position (for example, within a radius of 5 m from the point member position in the direction of a bridge axis) for each point member position specified by the inspection specifying unit 14 from the inspection data acquisition unit 15, analyzes the image data, and determines from the image data, whether or not there is damage of the type of damage specified as the inspection target, and the degree of damage in a case where there is the damage. Hereinafter, information indicating the presence or absence of damage and the degree of damage is referred to as damage information. A damaged portion extraction unit and a damage extraction unit correspond to the above-described function of the inspection data analysis unit 16.

For example, for a width, a length, and an area of a range of cracking, peeling, or rebar exposure of the slab, the number per unit area of the rebar exposure, a length of deflection of the main girder, an area of corrosion of a steel member of the main girder, a length of a crack, the number of dropouts of a bolt or a nut, and a length of scouring, subsidence, moving, and sloping of a pier, a degree of damage is extracted by analyzing an image in which a member is a subject. In a case where there is a time-series fixed-point observation image, a temporal rate of change in the degree of the damage can be taken as the degree of damage again. In a case where a scale is imaged together with the image, it is easy to determine the degree of damage regarding the length, the width, and the range. Further, using various types of image analysis, it is possible to identify a difference in color between the damage and a surrounding sound place thereof and determine a damage range accompanied by a change in color of corrosion, lime precipitation, rebar exposure, or the like. In a case where image analysis cannot be performed, damage information may be determined through manual input of the user.

For each damage specified by the inspection specifying unit 14, the damage influence degree calculation unit 17 calculates the degree of influence of the damage on the soundness of the entire building (hereinafter referred to as a degree of damage influence) from the point member position closest to the damage, the imaging position of the damage image, and the degree of damage. A damage influence degree calculation unit corresponds to the above function of the damage influence degree calculation unit 17.

As an example, a method of calculating the degree of damage influence is as follows.

(1) In a case where there is no time-series fixed-point observation image of the crack of the slab, the degree of damage influence of the crack of the slab=an area of the crack of the slab/a distance from the point member position on the nearest lower slab surface to a capturing position of the image at which the crack of the slab has been extracted.

Here, an area S of the crack of the slab is a product of a vertical length $(X_1-X_0)$ of a cracked portion and a horizontal length $(Y_1-Y_0)$ of the cracked portion as illustrated in a FIG. 4B, that is, $S=(X_1-X_0)*(Y_1-Y_0)$. The area of the crack of the slab may be an approximate value obtained from the image or may be an actually measured area.

(2) In a case where there is the time-series fixed-point observation image of the crack of the slab, the degree of damage influence of the crack of the slab=an enlargement rate of the area of the crack of the slab per unit time/a distance from the point member position on the lower slab surface to a capturing position of the image at which the crack of the slab has been extracted.

Here, as illustrated in FIGS. 5A to 5F, an enlargement rate $rt_x$ of the area of the crack of the slab at an imaging time point $t_x$ can be expressed as follows.

$$rt_x=(nt_x-nt_{x-1})/(t_x-t_{x-1})$$

Here, $nt_x$=the number of dice-shaped cracks per unit area at an imaging time point $t_x$ $nt_{x-1}$=the number of dice-shaped cracks per unit area at an imaging time point $t_{x-1}$ Here, $t_{x-1}<tx$.

That is, a degree of increase in a crack density per unit time, that is, a crack increase rate can be seen through calculation of $rt_x$. As the unit time, day, week, month, year, or the like can be used. As a cause of an increase in crack increase rate of the slab, an abnormal increase of traffic amount in a short period, passage of an overloaded vehicle, salt damage due to abnormal use of a snow melting agent, or the like is conceivable.

(3) For a width, a length, and an area of a range of peeling of the slab, a rust juice, lime release, or rebar exposure, the number of rebar exposures per unit area, a length of deflection of the main girder, a length, a width, and an area of corrosion, rupture, or crack of a steel member of the main girder, the number of dropouts of a bolt or a nut, scouring, subsidence, movement, and crack length of a pier, an angle of inclination, a length of a bridge axis right angle deviation, a relaxing length, a pot hole area of a pavement, and the like, the degree of damage influence as in the crack of the slab can be calculated. That is, the degree of influence damage is calculated according to an equation of degree of damage influence=degree of damage/distance from the nearest point member position to the damage extraction position. That is, in a case where the distance from the point member position to the damage extraction position is small, the degree of influence of damage on the important member becomes high, and in a case where the distance is large, the degree of influence of damage becomes low. The distance in the above equation may be replaced with an exponentiated distance with a value exceeding 1. Further, when there is a time-series fixed-point observation image at the same imaging position, the degree of damage influence can be calculated using an increase rate of damage as the degree of damage, as in (2).

The soundness determination unit 31 determines the soundness of the entire building on the basis of the degree of damage influence for each damage. The soundness of the building is stepwise or numerical evaluation of safety of the building. For example, an average value (a simple average value or a weighted average value) of the degree of damage influence is calculated by dividing a total of degrees of influence for each damage by the total number of damages, a result of the calculation is compared with a preset threshold value, and the soundness is determined to be "no urgent repair is necessary" in a case where the result of the calculation is smaller than the threshold value, and "urgent repair is necessary" in a case where the result of the calculation is equal to greater than the threshold value. This threshold value can be optimized using a statistical scheme. A soundness determination unit corresponds to the above function of the soundness determination unit 31.

Figure 6:
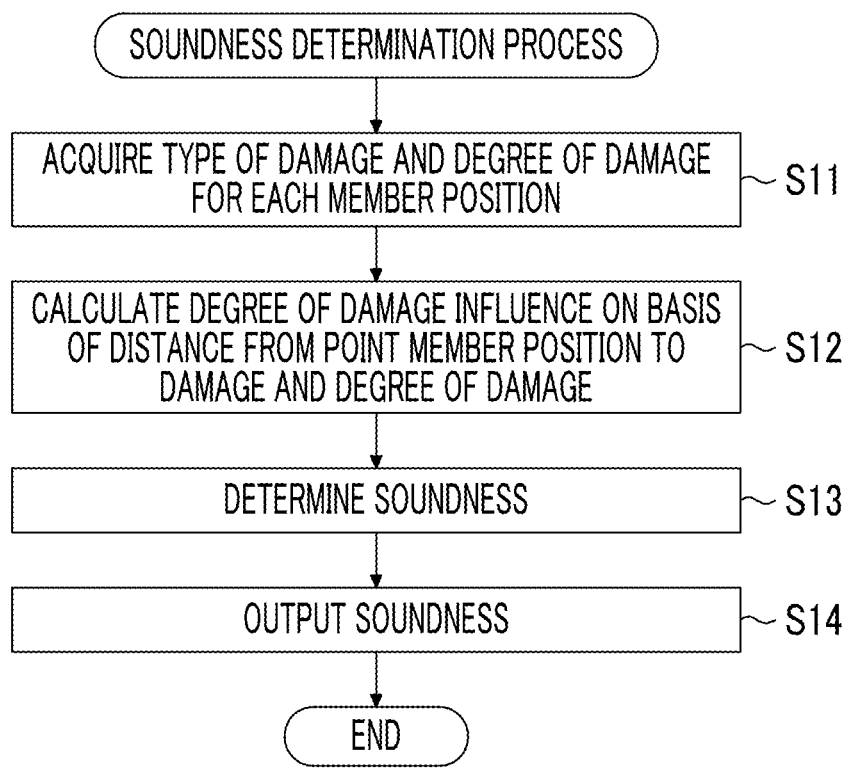
FIG. 6 is a flowchart of a soundness determination process.

FIG. 6 is a flowchart of a soundness determination process that is executed by the soundness determination device 100. A program for causing the soundness determination device 100 to execute this process is stored in a computer-readable storage medium such as a flash memory of the soundness determination device 100.

In S11, the inspection specifying unit 14 specifies a point member position which is a position of an important portion of the building which is a point of a determination of the soundness of the building from constituent members of the building, and a type of damage that is a soundness determination target near the point member position on the basis of the building structure information of the building structure information DB 18 (important portion position determination step).

The inspection data analysis unit 16 acquires the image data of which the imaging position is the vicinity of the point member position specified by the inspection specifying unit 14 from the inspection data acquisition unit 15, analyzes the image data, and determines from the image data, whether or not there is damage of the type of damage specified as the inspection target, and the degree of damage in a case where there is the damage (damaged portion extraction step).

In S12, the damage influence degree calculation unit 17 calculates the degree of damage influence for each damage on the basis of the distance from the nearest point member position to the damage and the degree of damage (damage influence degree calculation step).

In S13, the soundness determination unit 31 determines the soundness of the entire building on the basis of the degree of damage influence for each damage (soundness determination step).

In S14, the soundness output unit 32 outputs the soundness determined in S13 to a display, a printer, or the like. The soundness output unit 32 may superimpose an image of the damage having a degree of damage influence equal to or higher than a predetermined value, a position of the damage, a fitting image indicating the degree of damage, a graphic (for example, color coding), a warning text, or the like on the entire image of the building and output a resultant image. A soundness output unit corresponds to the above function of the soundness output unit 32.

Thus, since the point member position is determined from the structure information of the building, the degree of damage influence on the point member is calculated for each damage, and the soundness of the entire building is determined from the degree of damage influence of each damage, it is possible to perform an accurate and efficient soundness determination in consideration of the structure information of the building.

A range in which the present invention is applied is not limited to bridges, and the present invention can be generally applied to all buildings, including civil engineering structures such as tunnels, sheds, culverts, slope protections, retaining walls, dams, and revetments, and buildings such as apartments. That is, it is possible to determine an appropriate point member position and an appropriate type of damage according to the type of building, detect the damage from image data or the like, calculate the degree of damage influence for each damage, and determine the soundness of the building.

For example, it is assumed that the inspection target is a tunnel constructed using a pile construction scheme. In this case, for lining, a longitudinal striking joint, a transverse striking joint, a transverse direction joint, a longitudinal direction joint, a vicinity of a top edge, a vicinity at a middle of a lining span are determined to be point member positions, and types of damage of the inspection target are cracks continuous to the joints and the top edge, cracks near the middle of the liner span, fragmentation of cracks due to such cracks, lifting, peeling, discoloration, leakage, and steps. This is intended to intensively inspect places at which cracks or the like easily occur due to thermal expansion and contraction. Further, a cold joint, and an occurrence place of a honeycomb are shown in the use environment history information, positions thereof are determined to be the point member positions, and a deformation such as cracks at the positions is determined to be the type of damage that is the inspection target. This is because these are parts that are easily deformed due to a structural weakness.

A length, a width, an area of the damage near each point member position, or a rate of change thereof is set as the degree of damage, a distance from the nearest point member position to the damage position is calculated, a degree of damage influence of each damage is calculated therefrom, and the soundness of the building is determined.

Alternatively, in a case where the inspection target is an RC building, image data in which each position of members constituting a frame such as a pillar, a beam, a wall, and a slab is a subject is recorded in association with an imaging position thereof, the presence or absence of a type of damage corresponding to each member, such as a type of damage such as cracks, paint peeling, rebar exposure, painted surface chalking, and leakage, and a degree of the damage are detected from the image data, a degree of damage influence of each damage is calculated using a distance from the position of the damage thereof to a stress concentration position (for example, a joint portion) of a frame constituent member, and the degree of damage, and the soundness of the building that is an inspection target is determined.

EXPLANATION OF REFERENCES

14: inspection specifying unit
15: inspection data acquisition unit
16: inspection data analysis unit
17: damage influence degree calculation unit
18: building structure information database
31: soundness determination unit
32: soundness output unit

What is claimed is:

1. A soundness determination device comprising:
    a processor configured to
        extract a damaged portion of an inspection target of one or a plurality of buildings from a captured image in which a surface of an arbitrary building is a subject;
        extract a degree of damage in the damaged portion by analyzing the captured image;
        acquire structure information of the building in the captured image;
        determine a position of a point on a member of the building in the captured image, the point being a weighted portion of the building in structural mechanics;
        calculate, for each damaged portion of the building, a degree of damage influence on the basis of a distance between the position of the point and a position of the damaged portion of the building, and the degree of damage in the damaged portion; and
        determine soundness of the building on the basis of the degree of damage influence for each damaged portion of the building.

2. The soundness determination device according to claim 1,
    wherein the processor is further configured to calculate the degree of damage influence according to a reciprocal of the distance between the position determined for calculating the degree of damage influence and the position of the damaged portion of the building.

3. The soundness determination device according to claim 1,
    wherein the processor is further configured to
        extract a type of damage in the damaged portion of the building, and calculate the degree of damage influence on the basis of a relative positional relationship between the position determined for calculating the degree of damage influence and the position of the damaged portion of the building, and the type of damage and the degree of damage in the damaged portion of the building.

4. The soundness determination device according to claim 2,
wherein the processor is further configured to
extract a type of damage in the damaged portion of the building, and
calculate the degree of damage influence on the basis of a relative positional relationship between the position determined for calculating the degree of damage influence and the position of the damaged portion of the building, and the type of damage and the degree of damage in the damaged portion of the building.

5. The soundness determination device according to claim 3,
wherein the position determined for calculating the degree of damage influence is determined from at least one of a joint portion of a member, a support, or a reinforcing place of a concrete of the building.

6. The soundness determination device according to claim 4,
wherein the position determined for calculating the degree of damage influence is determined from at least one of a joint portion of a member, a support, or a reinforcing place of a concrete of the building.

7. The soundness determination device according to claim 5,
wherein the position determined for calculating the degree of damage influence is a position of a central portion between spars of a concrete bridge girder or a central portion between spars of a steel bridge girder,
the type of damage in the damaged portion of the building includes at least one of crack of the concrete bridge girder, or corrosion, crack, or rupture of the steel concrete bridge girder,
a degree of damage in the damaged portion of the building includes at least one of degrees of progress of the crack of the concrete bridge girder, or the corrosion, the crack, or the rupture of the steel concrete bridge girder, and
the processor is further configured to calculate the degree of damage influence according to a value obtained by multiplying a reciprocal of the distance between the position determined for calculating the degree of damage influence and the position of the damaged portion of the building by at least one of the degrees of progress of the crack of the concrete bridge girder, or the corrosion, the crack, or the rupture of the steel concrete bridge girder.

8. The soundness determination device according to claim 6,
wherein the position determined for calculating the degree of damage influence is a position of a central portion between spars of a concrete bridge girder or a central portion between spars of a steel bridge girder,
the type of damage in the damaged portion of the building includes at least one of crack of the concrete bridge girder, or corrosion, crack, or rupture of the steel concrete bridge girder,
a degree of damage in the damaged portion of the building includes at least one of degrees of progress of the crack of the concrete bridge girder, or the corrosion, the crack, or the rupture of the steel concrete bridge girder, and
the processor is further configured to calculate the degree of damage influence according to a value obtained by multiplying a reciprocal of the distance between the position determined for calculating the degree of damage influence and the position of the damaged portion of the building by at least one of the degrees of progress of the crack of the concrete bridge girder, or the corrosion, the crack, or the rupture of the steel concrete bridge girder.

9. The soundness determination device according to claim 7,
wherein the degree of progress of the crack of the concrete bridge girder, and the corrosion, the crack, and the rupture of the steel concrete bridge girder includes at least one of a length and a width of the crack of the concrete bridge girder, an area of the corrosion of the steel concrete bridge girder, or a length and a width of the crack or the rupture of the steel concrete bridge girder.

10. The soundness determination device according to claim 7,
wherein the degree of progress of the crack of the concrete bridge girder, and the corrosion, the crack, and the rupture of the steel concrete bridge girder includes at least one of a rate of change of a length and a width of the crack of the concrete bridge girder, a rate of change of an area of the corrosion of the steel concrete bridge girder, or a rate of change of a length and a width of the crack or the rupture of the steel concrete bridge girder.

11. The soundness determination device according to claim 1,
wherein the processor is further configured to output soundness of the building.

12. The soundness determination device according to claim 11,
wherein the processor is further configured to output all or a part of a captured image of the damaged portion of the building according to the degree of damage influence of each damaged portion of the building.

13. A soundness determination method comprising:
extracting a damaged portion of an inspection target of one or a plurality of buildings from a captured image in which a surface of an arbitrary building is a subject;
extracting a degree of damage in the damaged portion by analyzing the captured image;
acquiring structure information of the building in the captured image;
determining a position of a point on a member of the building in the captured image, the point being a weighted portion of the building in structural mechanics;
calculating, for each damaged portion of the building, a degree of damage influence on the basis of a distance between the position of the point and a position of the damaged portion of the building, and the degree of damage in the damaged portion; and
determining soundness of the building on the basis of the degree of damage influence for each damaged portion of the building.

14. A non-transitory computer readable recording medium storing a soundness determination program for causing a computer to execute the soundness determination method according to claim 13.

* * * * *